Patented Aug. 17, 1954

2,686,750

UNITED STATES PATENT OFFICE 2,686,750

VITAMIN B12 PURIFICATION PROCESS

Harry G. Anderson, Wilson, and Robert W. Rivett, Waukegan, Ill., assignors to Abbott Laboratories, North Chicago, Ill., a corporation of Illinois No Drawing. Application August 25, 1950, Serial No. 181,575

6 Claims. (Cl. 167—81)

The present invention relates to the purification of valuable vitamin products which are of value in the treatment of anemia, and in the enrichment of animal feeds deficient in the "animal protein factor." More particularly, the invention relates to the purification of aqueous concentrates of vitamin $B_{12}$ and vitamin $B_{12b}$, as well as the purification of solutions of these vitamins to make them more adaptable to isolation of the vitamins in crystalline form.

Vitamin $B_{12}$ [see Rickes et al., Science, 107, 396 (1948) and 108, 134 (1948)] and the related compound, vitamin $B_{12b}$, also called hydroxocobalamin [Pierce et al., J. A. C. S. 71, 2952 (1949)], are known to have growth promoting properties for Lactobacillus lactis Dorner such as the assay conditions described by Shorb in J. Biol. Chem., 169, p. 455-6. These vitamins find a commercial use in incorporation into animal feeds and provide an inexpensive form of growth promoting agent by which the utilization of food intake by the animal is greatly enhanced. The use of these vitamins as therapeutic factors in the treatment of human anemia is now well established.

We have discovered a new process for the removal and concentration of these vitamins from the broth and mycelium produced by the fermentation of various microorganisms. It is known that vitamin $B_{12}$ and vitamin $B_{12b}$ also called hydroxocobalamin are present in a variety of natural substances, including milk powder, beef extract, liver, and the broth and mycelium (cells and filterable solids) of various microorganisms, including Mycobacterium smegmatis: Lactobacillus arabinosus, Bacillus subtilis: several Streptomyces species, such as S. rosechromogenus, S. griseus, and S. antibioticus.

In the extraction and concentration process of our invention and those of the prior art there is obtained an aqueous solution containing highly pigmented impurities which are mostly yellow and brown in color and which make the aqueous concentrate very undesirable from the standpoint of pharmaceutical elegance and which will contaminate any further preparation made from the aqueous concentrate whether it be a solution for marketing or a dried residue. If this pigmented material is not removed from the solution subsequent crystallization is difficult and perhaps impractical. By using the process of our invention one may successfully remove these pigmented impurities at low cost by a process quite simple in detail and requiring only standard laboratory and manufacturing equipment.

It appears that the factor produced by the hereinafter described process is vitamin $B_{12}$ or vitamin $B_{12b}$, or vitamin $B_{12a}$ or a mixture thereof, but there is a possibility that such factor may not be chemically or even therapeutically identical with these products; and in this event applicants reserve the right to designate the factor produced by them as a "vitamin $V_{12}$-like factor."

It is an object of the invention to prepare the vitamin $B_{12}$-like factor in biological sources in pure form free from undesirable pigmented impurities.

It is also an object of the present invention to prepare a vitamin $B_{12}$-like factor in pure form from the fermentation products of Streptomyces griseus.

According to our process we prefer to take the fermentation products of a cultured Streptomyces griseus, and after removal of the fermentation liquor we treat the mycellium with steam and extract the vitaminic material which may contain vitamin $B_{12}$ and vitamin $B_{12b}$ also called hydroxocobalamin and perhaps other members of this vitamin $B_{12}$-like factor, with large volumes of water. The mycellium extract is then adsorbed on an activated carbon, such as "Darco G 60," following which it is eluted from the carbon by a solution of a solvent selected from the class consisting of lower alkanols, ketones and carboxylic acid esters, said compounds having not more than four carbon atoms, in water. As examples of the solvents coming under this classification are methanol, ethanol, isopropanol, n-propanol, n-butanol, acetone, methylethylketone, methyl formate, ethyl formate, methyl acetate and ethyl acetate. We have discovered that for our elution isopropanol is the most satisfactory. We have obtained preferred results when the eluting agent is adjusted to an alkaline pH with an alkali, such as ammonium hydroxide. The preferred pH range is 9-9.5. The eluate is then concentrated and further extracted into an equal volume of isopropanol during which operation ammonium sulfate is added to effect a more efficient removal of the vitamin factor into the isopropanol. This isopropanol solution is then separated and is ready for the rather critical treatment which effectively removes the pigmented contaminants which are so difficult to remove from the solution without loss of vitamin $B_{12}$-like factor activity. Alternately, one may use an aqueous extract of the isopropanol solution with equal success. The aqueous extract may be obtained by concentrating the isopropanol solution by evaporation and extracting with water or by obtaining two phases by adding benzene and water to the isopropanol solution and then separating the aqueous phase which contains most of the vitamin B₁₂-like activity. Also, in place of the isopropanol one may use a lower alkanol containing not more than four carbon atoms as the solvent. For example, one may use methanol, ethanol, n-propanol, n-butanol or isobutanol. We have discovered that the solvent should be moistened with water for the most satisfactory results. We have discovered that isopropanol gives the most satisfactory results. This color removal phase is perhaps the most important and critical phase of our process. Unless the highly pigmented contaminating impurities are removed from the vitamin B₁₂-like factory they will remain present with the vitamin material whether it is concentrated or dried. Such a product will have an unsightly appearance and will be highly undesirable from the esthetic standpoint and may also produce unwanted side effects when used therapeutically, such as to cause the product to be pyrogenic or toxic.

From the standpoint of continuity this pigment removal process will be described only in rudimentary form and will be elaborated later on in the specification. Essentially the isopropanol, water or other lower alkanol solution is treated with an amine of the type specified according to the invention either by itself or in an organic solvent and after a series of extractions and washings the aqueous solution is removed from the particular amine and its organic solvent. The aqueous solution containing the vitamin B₁₂-like factor is then ready for further extraction with an alkanol containing 4 or 5 carbon atoms, such as butanol and pentanol, with simultaneous treatment by a salting-out agent, such as ammonium sulfate. The butanol phase which is insoluble in the aqueous solution is then washed with distilled water until all of the pink color is removed from the butanol phase, which indicates that the vitamin activity has been removed into the aqueous phase.

The aqueous solution is then passed over a column of acid-washed alumina having a pH of 4 which effects further purification and provides one with a pink aqueous solution having little or no contamination by colored impurities. This solution is then passed through a mixed cation and anion exchange medium which we have found to be most satisfactory when packed with resins of the Amberlite type. The resulting eluate is then treated with acid or alkali to adjust the pH to 4 and is then concentrated in vacuum to remove any possible butanol remaining and to reduce the volume. The resulting product is a clear pink aqueous solution which is devoid of any pigmented contamination. If it is desired to market the solution in aqueous form for parenteral injection the concentration may be adjusted by adding or evaporating water and filled into ampoules and sealed.

Alternately if a dried product is desired it may be obtained by lyophilization or drum drying at reduced pressure, or the product may be precipitated from the solution by adding acetone, and isolated as crystalline material by known methods.

As was stated above, the critical part of the process is the removal of the highly pigmented impurities by the treatment of the isopropanol, aqueous or lower alkanol solution. In more detail this process consists of the treating of the isopropanol, aqueous or lower alkanol solution with an amine either by itself or in an organic solvent. We have discovered that only certain amines will produce the desired result and these compounds are preferably the non-aromatic type primary amine. More particularly, these amines are selected from the class consisting of aliphatic primary amines containing from 3 to 18 carbon atoms inclusive, alicyclic primary amines containing from 5 to 10 carbon atoms inclusive, aralkyl primary amines containing from 6 to 12 carbon atoms inclusive and quinoline. Alternately, mixtures of these amines may be used.

The aliphatic primary amines may be saturated or unsaturated or normal or branched. We have found the following aliphatic amines among those to be satisfactory in our process, isopropylamine, n - butylamine, n - heptylamine, n - decylamine, n - dodecylamine, n-hexadecylamine, sec. - hexylamine, 2 - aminoheptane, allylamine, 2-ethylbutylamine, tert.-octylamine, tert.-nonylamine and octadecylamine.

We have discovered that the more satisfactory aliphatic amines according to our process are those containing from 7 to 16 carbon atoms. We have found the most desirable compound from the commercial standpoint to be the product known as "Armeen" C, which is a mixture of n-decylamine (9%), n-octylamine (8%), n-dodecylamine (47%), n-tetradecylamine (18%), n-hexadecylamine (8%), n-octodecylamine (5%) and n-octodecenylamine (5%).

Among the alicyclic primary amines containing from 5 to 10 carbon atoms inclusive which have been found to be satisfactory to our process are, cyclopentylamine, cyclohexylamine, 2-methylcyclohexylamine, decalylamine and tetralylamine.

Among the aralkyl primary amines containing from 6 to 12 carbon atoms inclusive which have been found to be satisfactory according to our process are benzylamine, γ-phenyl-n-propylamine, ω - phenyl-n-hexylamine, β - naphthylethylamine, and p-xylylamine. One of the critical properties required of the amines is comparative insolubility in water.

Applicants have tried a large number of other amines such as the secondary amines, tertiary amines, substituted amines, aromatic amines and the diamines. However, these were found to be almost totally inoperative for our process.

It will be observed that some of the amines according to our process are solids, in which case it is usually necessary to use a solvent to dissolve the amine. We have found that the aliphatic alcohols containing from 2 to 12 carbon atoms inclusive are the satisfactory solvents for the amines. We have discovered that normal butanol and normal pentanol are the most satisfactory solvents with normal butanol being the more satisfactory of the two. When lower numbers of the series of aliphatic alcohols are used, such as those containing 2 or 3 carbon atoms, a hydrophobic solvent in the nature of an inert non-polar organic compound such as the hydrocarbons, benzene, toluene, xylene and hexane or an ether such as diethyl ether and other solvents of this same general classification, must be added to the aliphatic alcohol solvent. We have discovered that for our purpose benzene is the most satisfactory. Among the solvents which we have discovered to be satisfactory as a solvent for the amine are ethanol, isopropanol, n-butanol, tertiary-butanol, n-pentanol, n-decanol and n-dodecanol.

In the research investigation which resulted in the present invention, we tested many solvents including esters, ketones, ethers and hydrocarbons. However, with the exception of the use of the hydrophobic, inert, non-polar solvent in conjunction with the aliphatic alcohols as solvents for the amines, none of these solvents were operable in our process.

A solvent for the amines is not entirely necessary unless the amine is a solid. However, we have found that the use of an aliphatic alcohol such as n-butanol as a solvent for the amine appears to enhance the removal of the undesirable pigmented impurities. The process itself becomes more practical when a solvent is used.

In order more clearly to disclose the nature of the present invention, several specific examples illustrating the preparation of typical compounds will hereinafter be described. It should be understood, however, that this is done solely by way of example and is intended neither to delineate the scope of the invention nor limit the ambit of the appended claims.

Example I

Five thousand gallons of broth resulting from the normal fermentation of *Streptomyces griseus* is treated with a filtering agent, stirred and filtered on a filter press. After washing the cake on the filter press with water, the filtrate and the washings are discarded and the filter cake which consists of mycelium of the *Streptomyces griseus* is treated with steam until the condensate of the steam reaches the boiling point of water. The hot mycelia is further extracted with 500 gallons of water and the total extract which totals 800 to 1200 gallons, is treated with 2½% to 3½% by weight of an activated carbon such as "Darco," and 1% to 2% by weight of a filtering aid, such as a diatomaceous earth or a cellulosic product. After stirring for 15 minutes the solids are removed on a filter press and after washing several times with water the filtrate and the washings are discarded. The carbon absorbate is eluted twice with 200 to 400 gallons of an aqueous solution of isopropanol (58% to 60% isopropanol) which has been adjusted to a pH of 9.0–9.5 by the addition of ammonia. The eluates are combined and are concentrated to approximately 50 gallons by evaporation in vacuum at not higher than 50° C. The concentrated carbon eluate (50 gallons) is treated with an equal volume of isopropanol and 1½ pounds of ammonium sulfate per gallon of eluate and this mixture is stirred from 2 to 4 hours. After the alcohol and water phase has separated, the water is discarded and the isopropanol solution which contains the vitamin $B_{12}$-like factor is ready for the important amine-purification treatment.

To the isopropanol solution is added 5% by weight of "Armeen"-C (a mixture of n-alkylamines as previously defined) and 10% by volume of water. The mixture is heated somewhat and 80% by volume of benzene is added. After stirring for 5 minutes the mixture separates into two phases and the benzene-isopropanol-amine phase is separated and discarded. The aqueous phase is washed twice with an equal volume of 25% "Armeen"-C in butanol. The aqueous phase is retained for further purification.

The aqueous phase is acidified to a pH of 4 with sulfuric acid and the dissolved amines are precipitated and filtered off as the sulfate. The filtrate is treated with an equal volume of butanol plus about 225 grams of ammonium sulfate per liter of aqueous solution and after stirring the butanol phase is separated and saved. The extraction of the aqueous phase is repeated with butanol and ammonium sulfate and the butanol extracts are combined. The butanol layer which contains the vitamin $B_{12}$-like activity is extracted several times with distilled water after which the aqueous extracts are combined and the butanol discarded. The pink aqueous solution which is obtained is passed over acid-washed alumina having a pH of 4 in which the alumina column contains one pound of alumina for each three gallons of the aqueous extract. The solution is just about devoid of any color except pink and is now passed over a mixed resin column containing a mixture of cation exchange medium and anion exchange medium. After this treatment, the solution is adjusted to a pH of 4 and concentrated in vacuum at a maximum temperature of 50° C. to remove the last vestiges of butanol and to reduce the volume of the solution containing the vitamin $B_{12}$-like factor which is believed to be in the form of vitamin $B_{12b}$.

Following concentration the solution is now ready for further purification if desired. The solid product may be obtained by lyophilization, drum drying or acetone precipitation so that the precipitate may be purified by crystallization. Alternately, if it is so desired, the concentration may be further adjusted by further evaporation or dilution should it be desirable to market the vitamin in solution form.

Example II

To an aqueous solution eluted from the carbon absorbate of Example I in the amount of 20 cc. containing 456 micrograms of vitamin $B_{12b}$, there is added 20 cc. of n-butanol and 0.2 cc. of 2-aminoheptane. After shaking for several minutes the mixture is allowed to separate and the aqueous phase is separated and extracted several times with further butanol. The resulting aqueous phase is then adjusted to a pH of 3 with a 20% solution of sulfuric acid. The resulting solution is light pink in color, whereas the starting solution was dark brown. The final solution is found to contain 403 micrograms of vitamin $B_{12b}$ showing a yield of 89% from this purification.

It will be observed that in this example an aqueous solution of the vitamin $B_{12}$-like factor is used. However, the same excellent results may be obtained by using an isopropanol, or other lower alkanol (containing no more than four carbon atoms) solution moistened by the addition of water to the vitamin $B_{12}$-like factor.

Example III

By using the same starting material as in Example II in the amount of 100 milliliters containing 11,000 micrograms of vitamin $B_{12b}$, which is an almost dark brown opaque solution, there is added 100 milliliters of a 50% solution of n-dodecylamine dissolved in n-butanol. After treatment in accordance with the process of Example II, 500 milliliters of fresh n-butanol are added to the concentrate with 45 g. of ammonium sulfate. The butanol phase is extracted with distilled water which is found to contain 10,800 micrograms of vitamin $B_{12b}$, which shows a 98% recovery of vitamin $B_{12}$. The resulting solution is light pink in color and needed very little further purification.

Example IV

Beginning with the same starting material as in Example III containing 11,000 micrograms of vitamin $B_{12b}$ there is added 100 cc. of a 50% solution of n-hexadecylamine in n-butanol. After proceeding in accordance with the process of Example III there is about 1,284 micrograms of vitamin $B_{12b}$ for a recovery of 89%. The resulting solution is light pink in color and suitable for immediate administration with very little further purification.

Others may readily adapt the invention for use under various conditions of service, by employing one or more of the novel features disclosed, or equivalents thereof. As at present advised with respect to the apparent scope of our invention, we desire to claim the following subject matter.

We claim:

1. In the process for the removal of pigmented impurities from a vitamin $B_{12}$ active factor the steps which comprise contacting a solution of the impure factor with a member of the group consisting of comparatively water insoluble aliphatic primary amines containing from 7 to 16 carbon atoms and mixtures thereof, and separating the impurity-containing amine phase from the purified vitamin $B_{12}$ solution.

2. The process of claim 1 wherein the amine is a mixture of aliphatic primary amines containing from 7 to 16 carbon atoms, said mixture consisting predominately of n-dodecylamine.

3. The process of claim 1 wherein the amine is n-dodecylamine.

4. The process of claim 1 wherein the amine is 2-aminoheptane.

5. The process of claim 1 wherein the amine is n-hexadecylamine.

6. The process for the removal of pigmented impurities from a vitamin $B_{12}$ active factor produced from the fermentation of *Streptomyces griseus* which comprises, passing an aqueous solution of the fermentation products of *Streptomyces griseus* over activated adsorbent carbon, eluting the carbon adsorbate with an aqueous solution of a solvent selected from the class consisting of lower alkanols, ketones, and carboxylic acid esters, said solvent having not more than four carbon atoms, extracting the eluate with a lower alkanol containing not more than 4 carbon atoms and containing ammonium sulfate, adding a comparatively water insoluble primary amine from the group consisting of aliphatic primary amines containing from 7 to 16 carbon atoms and mixtures thereof to the solution of impure factor, extracting the pure factor with an alkanol containing from 4 to 5 carbon atoms and containing ammonium sulfate, extracting the factor from the alkanol with water, passing the aqueous solution over acid-washed alumina, passing the effluent through a mixture of cation and anion exchange resins and collecting the purified aqueous concentrate of vitamin $B_{12}$ active factor.

References Cited in the file of this patent

UNITED STATES PATENTS

| Number | Name | Date |
|---|---|---|
| 2,443,485 | Waksman | June 15, 1948 |
| 2,505,053 | Kuehl | Apr. 25, 1950 |
| 2,530,416 | Wolf | Nov. 21, 1950 |
| 2,563,794 | Rickes | Aug. 7, 1951 |
| 2,582,589 | Fricke | Jan. 15, 1952 |
| 2,595,159 | Meyer | Apr. 29, 1952 |

FOREIGN PATENTS

| Number | Country | Date |
|---|---|---|
| 590,956 | Great Britain | Aug. 1, 1947 |

OTHER REFERENCES

Ellis, Journ. of Pharmacy and Pharmacology, vol. 1 (1949), pp. 60, 61.

Pierce, Journ. of the Am. Chem. Society, vol. 71, August 1949, page 2952.

Smith, Proceedings of the Biochemical Soc. in Biochemical Journ., October 1948, vol. 43, No. 1, pp. VIII, IX.

Rickes, Science, vol. 108 (1948), page 134.

Science, vol. 101, page 340 (1945).

Kaczka, Science, vol. 112, Sept. 29, 1950, pp. 354, 355.